US011113287B1

(12) United States Patent
Landry et al.

(10) Patent No.: US 11,113,287 B1
(45) Date of Patent: Sep. 7, 2021

(54) DATA STREAM MANAGEMENT SYSTEM

(71) Applicant: Teradata US, Inc., Dayton, OH (US)

(72) Inventors: Louis B. Landry, San Marcos, CA (US); Ilsun A. Park, Round Rock, TX (US); Oliver Ratzesberger, Poway, CA (US)

(73) Assignee: Teradata US, Inc., San Diego, CA (US)

( * ) Notice: Subject to any disclaimer, the term of this patent is extended or adjusted under 35 U.S.C. 154(b) by 226 days.

(21) Appl. No.: 15/593,310

(22) Filed: May 11, 2017

Related U.S. Application Data

(60) Provisional application No. 62/335,399, filed on May 12, 2016.

(51) Int. Cl.
*G06F 16/00* (2019.01)
*G06F 16/2455* (2019.01)
*G06F 16/335* (2019.01)
*G06F 16/33* (2019.01)
*G06F 16/28* (2019.01)

(52) U.S. Cl.
CPC ...... *G06F 16/24568* (2019.01); *G06F 16/335* (2019.01); *G06F 16/3331* (2019.01); *G06F 16/285* (2019.01)

(58) Field of Classification Search
CPC ............. G06F 16/24568; G06F 16/335; G06F 16/3331; G06F 16/285
See application file for complete search history.

(56) References Cited

U.S. PATENT DOCUMENTS

| 6,311,161 | B1* | 10/2001 | Anderson | G10L 19/008 704/500 |
|---|---|---|---|---|
| 8,977,763 | B1* | 3/2015 | Brown | H04L 67/28 709/231 |
| 2002/0087758 | A1* | 7/2002 | Dixon | G06F 3/0613 710/56 |
| 2002/0167958 | A1* | 11/2002 | Martin | H04L 49/103 370/429 |
| 2005/0283454 | A1* | 12/2005 | Ricchio | H04L 29/06 |
| 2008/0080383 | A1* | 4/2008 | Makino | H04L 47/10 370/236 |
| 2009/0125649 | A1* | 5/2009 | Goker | G11B 15/026 710/57 |
| 2010/0185748 | A1* | 7/2010 | Ishii | H04N 21/236 709/219 |
| 2010/0312801 | A1* | 12/2010 | Ostrovsky | G06F 16/1858 707/803 |
| 2010/0318689 | A1* | 12/2010 | Brune | G06F 12/0866 710/27 |

(Continued)

FOREIGN PATENT DOCUMENTS

WO    WO-2007107938 A1 * 9/2007 ........... G06F 3/0625

*Primary Examiner* — Jared M Bibbee
(74) *Attorney, Agent, or Firm* — Randy L. Campbell, Jr.

(57) ABSTRACT

A system may include at least one processor. The at least one processor may receive data from a plurality of independent data sources. The data from each respective data source is received at a rate determined by the respective data source. The at least one processor may further write the received data to at least one data store at a rate independent of the respective rates at which data from the plurality of independent data sources is received. A method and computer-readable medium are also disclosed.

17 Claims, 7 Drawing Sheets

(56) References Cited

U.S. PATENT DOCUMENTS

| | | | |
|---|---|---|---|
| 2013/0275434 A1* | 10/2013 | Platt | G06F 16/907 |
| | | | 707/741 |
| 2013/0322572 A1* | 12/2013 | Green | H04H 40/18 |
| | | | 375/340 |
| 2014/0025838 A1* | 1/2014 | Boss | H04N 7/17318 |
| | | | 709/231 |
| 2017/0026441 A1* | 1/2017 | Moudy | G06F 9/5027 |

* cited by examiner

DATA STREAM MANAGEMENT SYSTEM

CLAIM OF PRIORITY

This application claims the benefit of priority under 35 U.S.C. § 119(e) of U.S. Provisional Patent Application Ser. No. 62/335,399 filed on May 12, 2016, which is hereby incorporated by reference herein in its entirety.

BACKGROUND

As the use of information grows across multiple industries, the need to capture large amounts of data reflecting this information has grown in importance. A single entity may desire the use of various types of data, such as social media, sensor data, and website click streams, just to name a few. These types of data can be voluminous in nature, and thus, the ability to capture and store this data can be daunting. Moreover, not only is it desired to capture these types of data, but an entity may also desire these types of data be stored across multiple data retention platforms, such as file systems and databases. Thus, there is a need to ensure the capture of this data and store it across multiple data stores.

SUMMARY

According to one aspect of the disclosure, a system may include at least one processor. The at least one processor may receive data from a plurality of independent data sources. The data from each respective data source is received at a rate determined by the respective data source. The at least one processor may further write the received data to at least one data store at a rate independent of the respective rates at which data from the plurality of independent data sources is received.

According to another aspect of the disclosure, a method may include receiving data from a plurality of independent data sources. The data from each respective data source is received at a rate determined by the respective data source. The method may also include writing the received data to at least one data store at a rate independent of the respective rates at which data from the plurality of independent data sources is received.

According to another aspect of the disclosure, a computer-readable medium may be encoded with a plurality of instructions executable by a processor. The plurality of instructions may include instructions to receive data from a plurality of independent data sources. The data from each respective data source is received at a rate determined by the respective data source. The plurality of instructions may further include instructions to write the received data to at least one data store at a rate independent of the respective rates at which data from the plurality of independent data sources is received.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE DRAWINGS

Figure 1:
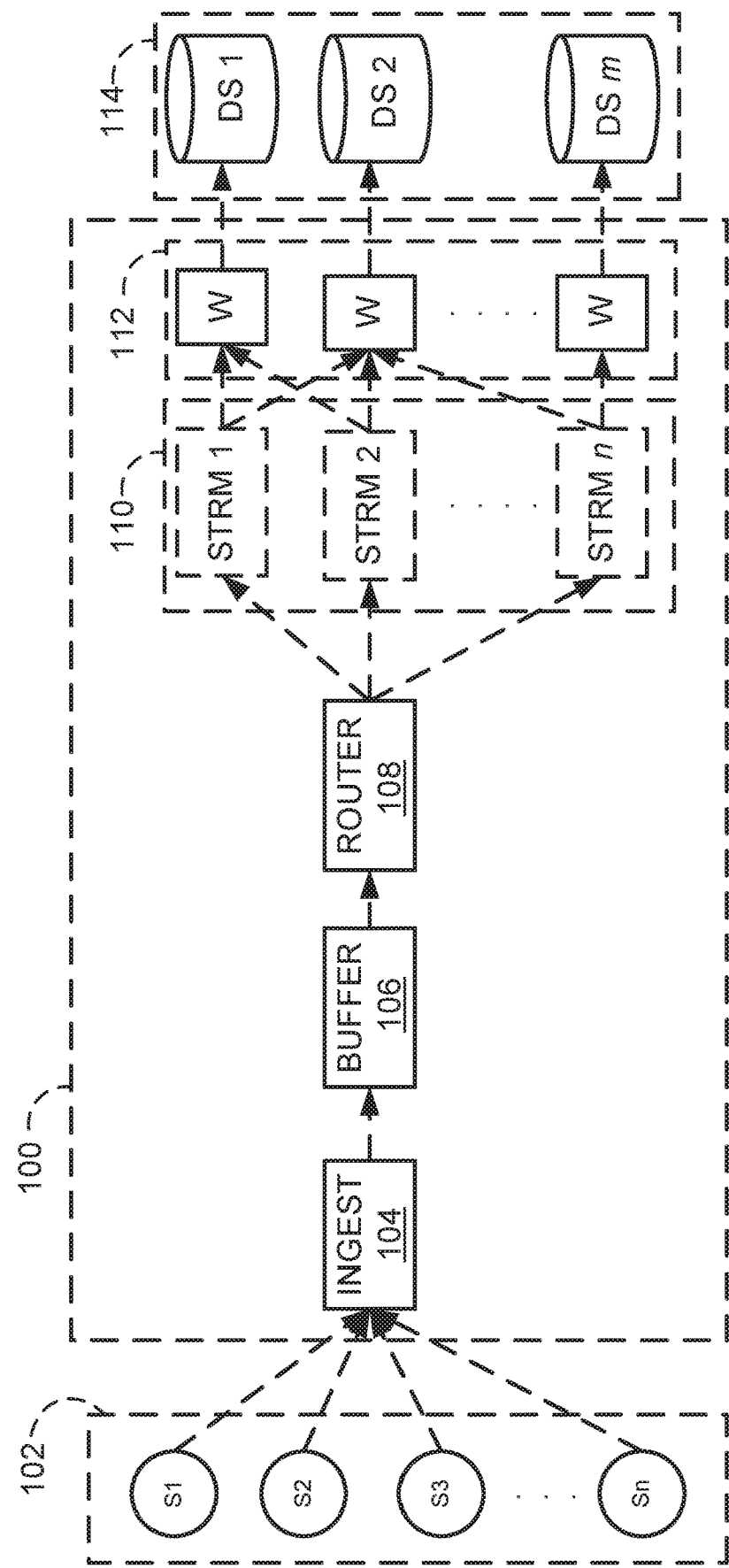
FIG. 1 is a conceptual diagram of an example data stream management system.

FIG. 1 is a conceptual diagram of a data stream management system 100. In one example, the data stream management system 100 may receive data from various data sources 102, individually designated as S1 through Sn. The data stream management system 100 may include an ingest module 104, which may ingest data from each of the data sources 102. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors.

In one example, the ingest module 104 may parse the received source data, authenticate the source data, provide metadata for the source data, and push the source data/metadata to a buffer module 106. In one example, the buffer module 106 may be horizontally elastic in nature allowing it to accept and hold as much data from the ingest module 104 as system parameters and/or resources allow. A router module 108 may intake buffered data from the buffer module 106 and push it to a data stream 110. In one example, a data stream 110 may exist for each data source 102, thus there may be n data streams 110 in the example of FIG. 1 (individually designated as "STRM 1" through "STRM n".

Figure 2:
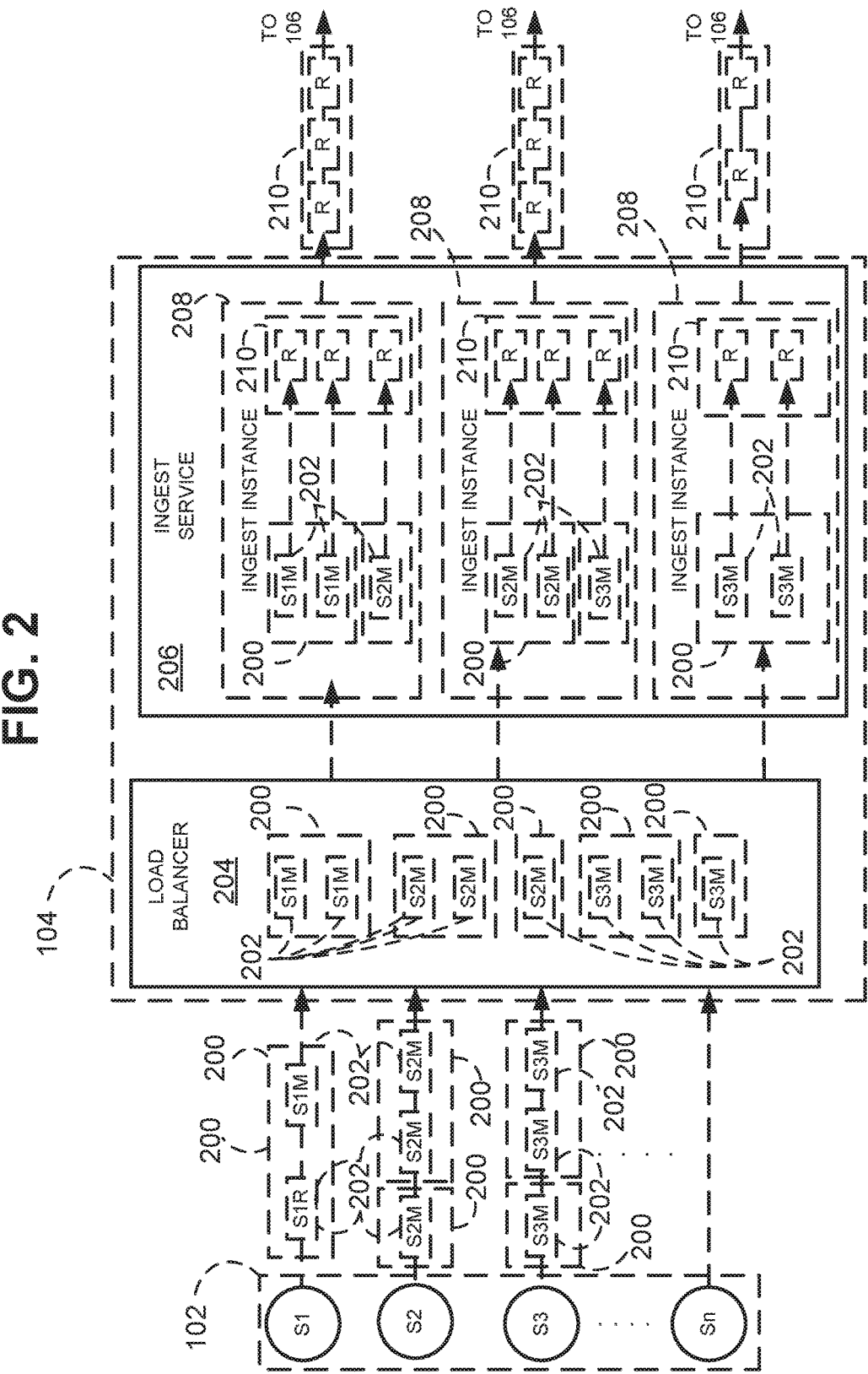
FIG. 2 is a block diagram of a portion of an example data stream management system.

FIG. 2 is a block diagram of an implementation example of the ingest module 110. In one example, the data sources 102 may stream requests 200 to the data management system 100. A "request" for purposes of the data management system 100 may include a single or multiple units of data formatted to the respective data source 102, such as online posts, sensor readings, website click streams, or any other capturable units of information that may be persistently stored in a data store, with each unit of data being a "message". For example, if data source S1 represented a social media website, each request 200 may contain one or more messages 202 from the source S1, individually designated as "S1M", with each message 202 representing a post (data unit) from the social media website.

In one example, the ingest module 104 may include a load balancer module 204 and an ingest service module 206. Requests 200 may be pushed to the load balancer module 204. The ingest service module 206 may execute one or more ingest instances 208. The ingest instances 208 may operate independently from one another. In one example, one or more requests 200 may arrive at the data stream management system 100, which may include additional information beyond the content of the messages 202 themselves, such as source identifier information. Each ingest instance 208 may be responsible for inspecting received requests 200 to identify each message 202 individually and authenticate the data source 102 of each request 200 that may include one or more messages 202. The number of ingest instances 208 is scalable based on current load and/or other criteria, or may be a static number in other examples.

In one example, the load balancer module 204 may route the requests 200 to the ingest service module 206 in round-robin fashion allowing the load at each ingest instance 208 to be as balanced as possible. In the example of FIG. 2, the load balancer 204 is receiving requests from sources S1, S2, and S3 with respective messages 202 being designated as "S1M", "S2M", and "S3M", respectively. As indicated, each request 200 may include one or more messages 202 from the respective source 102. The load balancer module 204 may ignore any such distinction to ingest requests 200 as fast as possible. In the example of FIG. 2 there are three ingest instance 208. However, the number of ingest instances may be scalable and dynamically-adjusted based on the number of requests 200 currently being received.

Once a request 200 is received by an ingest instance 208, the receiving ingest instance 208 may inspect the request 200 to authenticate the data source 102 and determine if one or more messages 202 are present. In one example, the authentication and recognition of the number of messages 202 may be performed by inspecting a request header included in each request 200. However, in other examples, authentication may be performed using other manners such as through credentials. In one example, the request header may include an application programming interface ("API") key that each data source 102 must provide for data to be accepted by the data stream management system 100. If the API key included in the request 200 is not one of an array of API keys known to the ingest service module 206, then the request 200 will not be processed further. For each message 202, the ingest instance 208 may wrap the message 202 in metadata to form a record 210. The metadata may include a unique record identifier, time stamp, and data source identifier, for example. Each record 210 may then be pushed by the respective ingest instance 208 to the buffer module 106.

In one example, the buffer module 106 may include one or more partitions 300. The example of FIG. 3 includes three partitions 300, but in other examples, the buffer module 106 may be configured to include fewer or additional partitions 300. The ingest instances 208 may independently push the records 210 serially to the partitions 300. In one example, this may be done in round-robin fashion, which allows the ingest instances 208 to push each record 210 to the partition 300 to last receive a record 210 with the goal of each partition 300 receiving records 210 at an approximately equal rate. However, in other examples, the records 210 may be pushed to the partitions 300 using different patterns of delivery, such as in batches and/or value-key based records, for example.

Figure 3:
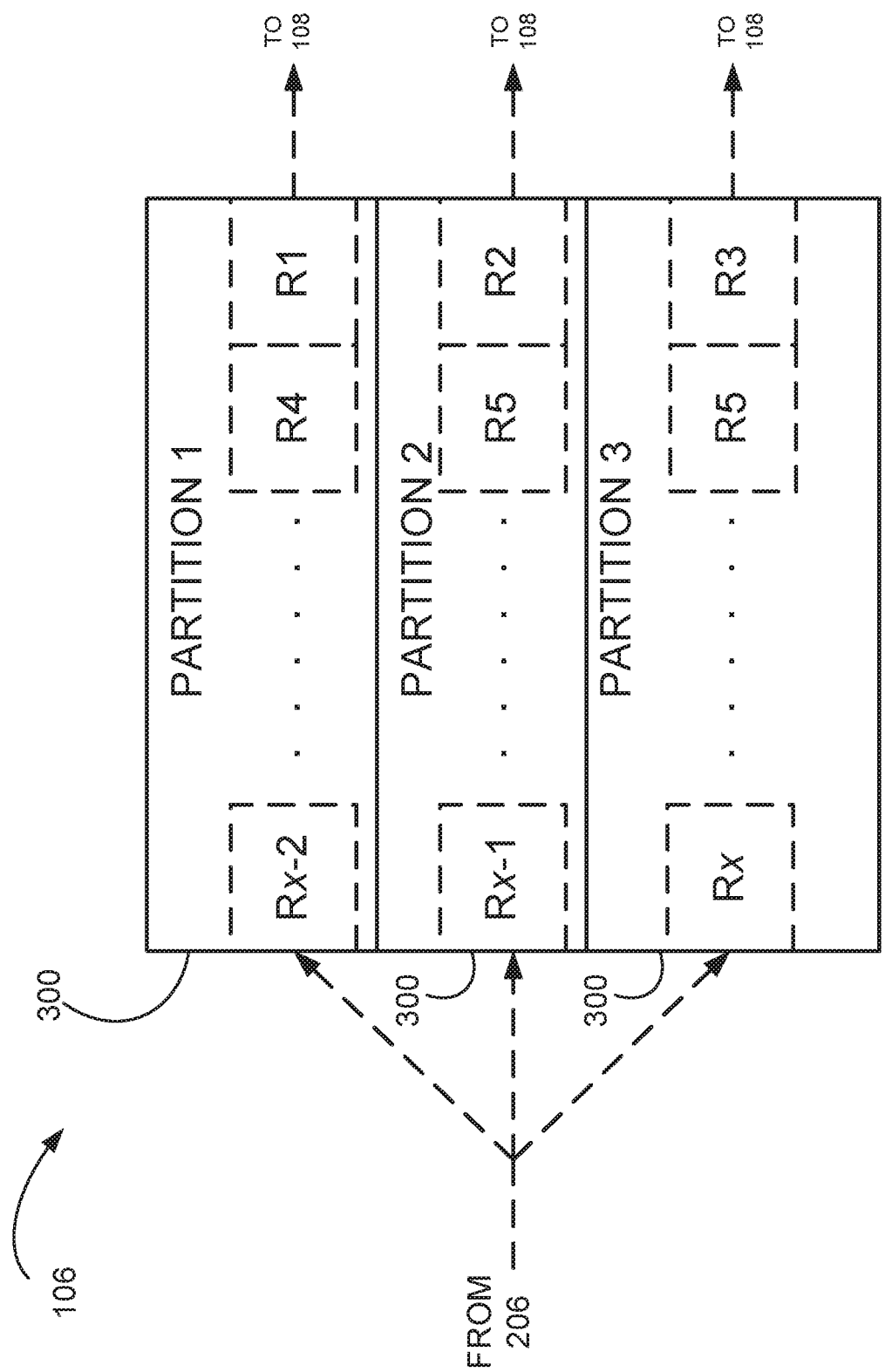
FIG. 3 is a block diagram of another portion of an example data stream management system.

In the example of FIG. 3, there are x number of records 210 in the buffer module 206. The example of FIG. 3 may represent the buffer module 206 at an instance of time since during operation of the data stream management system 100, records 210 are eventually pulled from the buffer module 106 by the router module 108, thus the number of records 210 may vary in the buffer module 106 depending on load at any given time. Each partition 300 of the buffer module 206 may expand horizontally to accept as many records 210 as system parameters and/or system resources allow.

Figure 4:
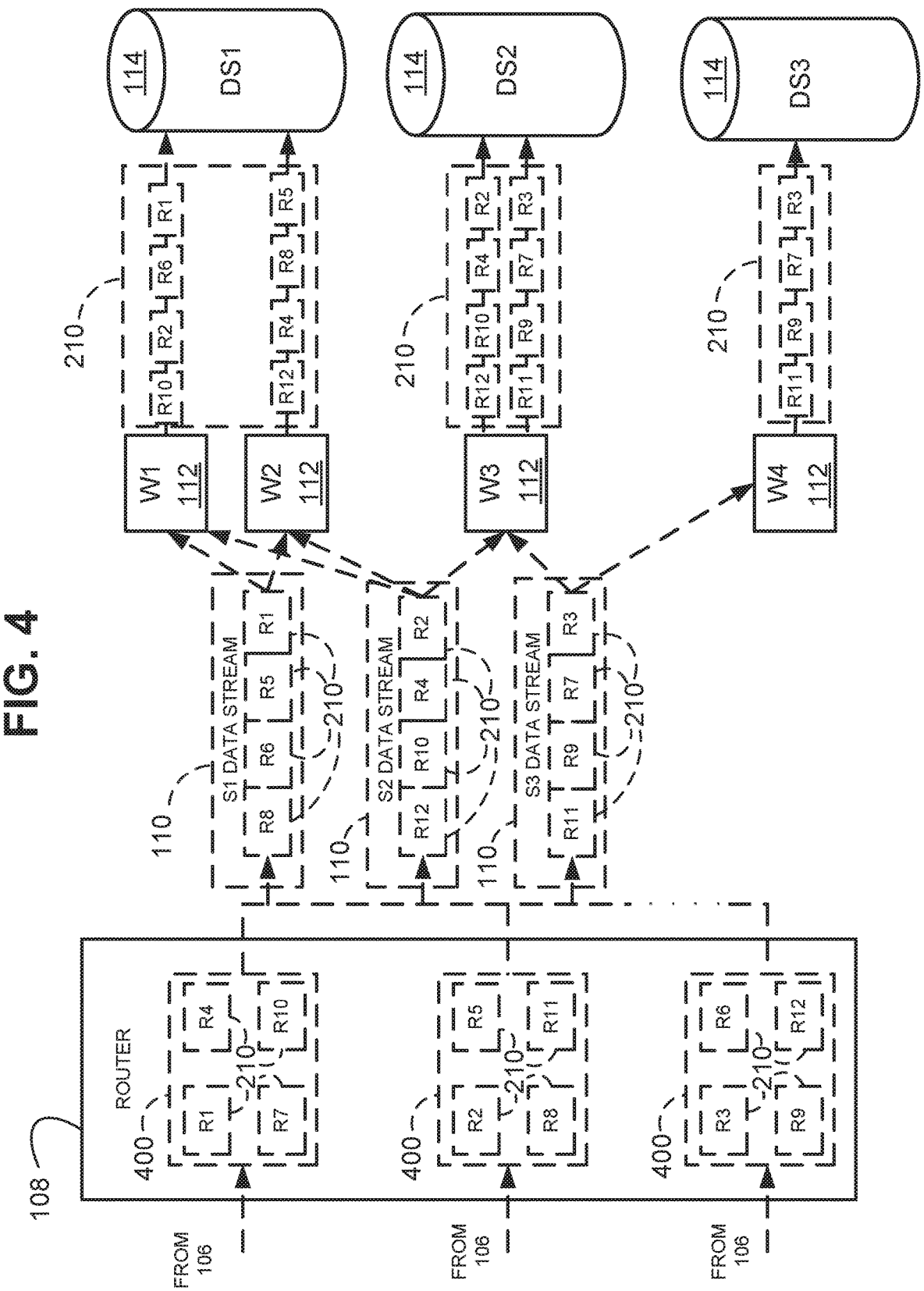
FIG. 4 is a block diagram of another portion of an example data stream management system.

FIG. 4 is a block diagram illustrating example operation of the router module 108, data streams 110 and writer modules 112. In one example, the router module 108 may include one or more router instances 400. Each routing instance 400 may independently operate to route records 210 to the data streams 110. In the example of FIG. 4, the router module 108 includes three router instances 400, however, the router module 108 may include fewer or additional router instances 400, which may be dynamically adjusted based on load or other criteria. Each router instance 400 may pull records 210 from the buffer module 106. In one example, records 210 may be pulled in predetermined-sized blocks, such that, depending on the record size, a different number of records 210 may make up each block when pulled by the router instance 400. The records 210 may be pulled from the buffer module 106 in a round-robin format such that each record 210 is pulled from the last partition 300 to have had a record 210 pulled from it. However, in other examples, the records 210 may be pulled by the router instances 400 according to a different format. The number of records 210 that any routing instance 400 may process at a single time may vary based on record size, system parameters, and/or system load.

In one example, the routing instances 208 may push the records 210 to the data streams 110. The routing scheme may be rules-based in nature. For example, in FIG. 4, the rules governing the router module 106 may provide that records 210 are to be pushed to a data stream 110 based on the data source 102 of the router module 106. In such a scenario, each routing instance 400 may identify each data source 102 via API key included with the record 210 or other identification provided in the metadata. However, other routing rules may be implemented, such as content-based, for example. Moreover, the number of routing instances 400 may be dynamically adjusted based on the amount of records 210 in the buffer module 106, the number of partitions in the buffer module 106, and/or system load.

In the example of FIG. 4, each routing instance 400 is processing four records 210. Once the data source 102 is identified, a record 210 may be pushed to the respective data stream 110 by the routing instance 200. For example, records R1, R5, R6, and R8 originate from data source S1 and thus are pushed by the routing instances 400 to the S1 data stream. Like the buffer module 106, the data streams 110 are horizontally elastic allowing multiple records 210 to be added without the need for records 210 to be immediately consumed. The records 210 may be consumed by the writer modules 112 in sequential order of being placed in the data streams 110. Thus, the writer modules 112 consume the earliest-placed record 210 in the data streams 110.

The writer modules 112 may consume and write records 210 at a rate independent from the rate the requests 200 are received from the data sources 102 allowing the data stream management system 100 to ingest requests 200 at a data source-dependent rate. Typically, this data-source dependent rate may experience periods in which it is faster than the rate at which records 210 are written to the data store systems 114. Allowing the rate at which records 210 are consumed by the writer modules 112 to be independent from the data-source dependent rate of ingest allows management of backpressure resulting from more records 210 being added to the buffer module 106 than are being pulled from it. This reduces the chances of any load-based delay preventing the request 200 from being received by the data stream management system 100. Thus, regardless of the rate of ingest, the writer modules 112 can write to each respective data store 114 at a rate that each data store 114 can handle.

Each writer module 112 may be dedicated to a respective data store 114. Additionally, each data store 114 may have one or more dedicated writer modules 112. The number of writer modules 112 per data store 114 be dynamically adjusted based on the amount of data available in the data streams 110 to be written to a respective data store 114. In the example of FIG. 4, there are three data stores DS1, DS2, and DS3. Writer modules W1 and W2 write to data store DS1, writer module W3 writes to data store DS2, and writer module W4 writes to data store DS3. Each writer module 112 may write from each data stream 110 depending on user-based criteria. For example, the writer modules W1 and W2 each consume from the S1 and S2 data streams to write to their respective data stores 114. Writer module W3 consumes from the S2 and S3 data streams with writer module W4 consuming from the S3 data stream only to write to their respective data stores 114.

In one example, each data stream 110 may act as a buffer having an allocated amount of storage space. During operation of the of the data stream management system 100, each data stream 110 may receive records 210 from the routing instances 400. Once the data stream 110 reaches its maximum allocated storage space, the next record 210 may overwrite the oldest record or records depending the size of the current record 210 to be stored. The writer modules 110 may consume records 210 at different rates from one another based on various factors, such as differences in data store performance. However, so long as the writer modules 112 consume the records 210 from the data streams 110 prior to them being overwritten, the difference in writing speeds in inconsequential.

In the example of the FIG. 4, the entire records 210 are shown as being written to the data stores 114. In other examples, the writer modules 112 may write only the message 202 included in each record 210. This determination may be a user-based decision. In other examples, the writer modules 112 may also add additional data to the records 210 and/or messages 202 prior to writing to the respective data stores 114. The example of FIG. 4 also shows each record 210 being sequentially stored to a respective data store. However, in other examples, the records 210 may be written to a data store 114 in batches. In one example, one or more writer modules 112 may incorporate feedback from the data stores 114 via write exceptions, system monitoring data, or other feedback messages to dynamically adjust the frequency and batch sizes of data being written to the data stores. In addition, the writer modules 112 may adjust the data store configuration and scale allowing the writer modules 112 to write more/less data based on a current configuration of a respective data store 114.

Figure 5:
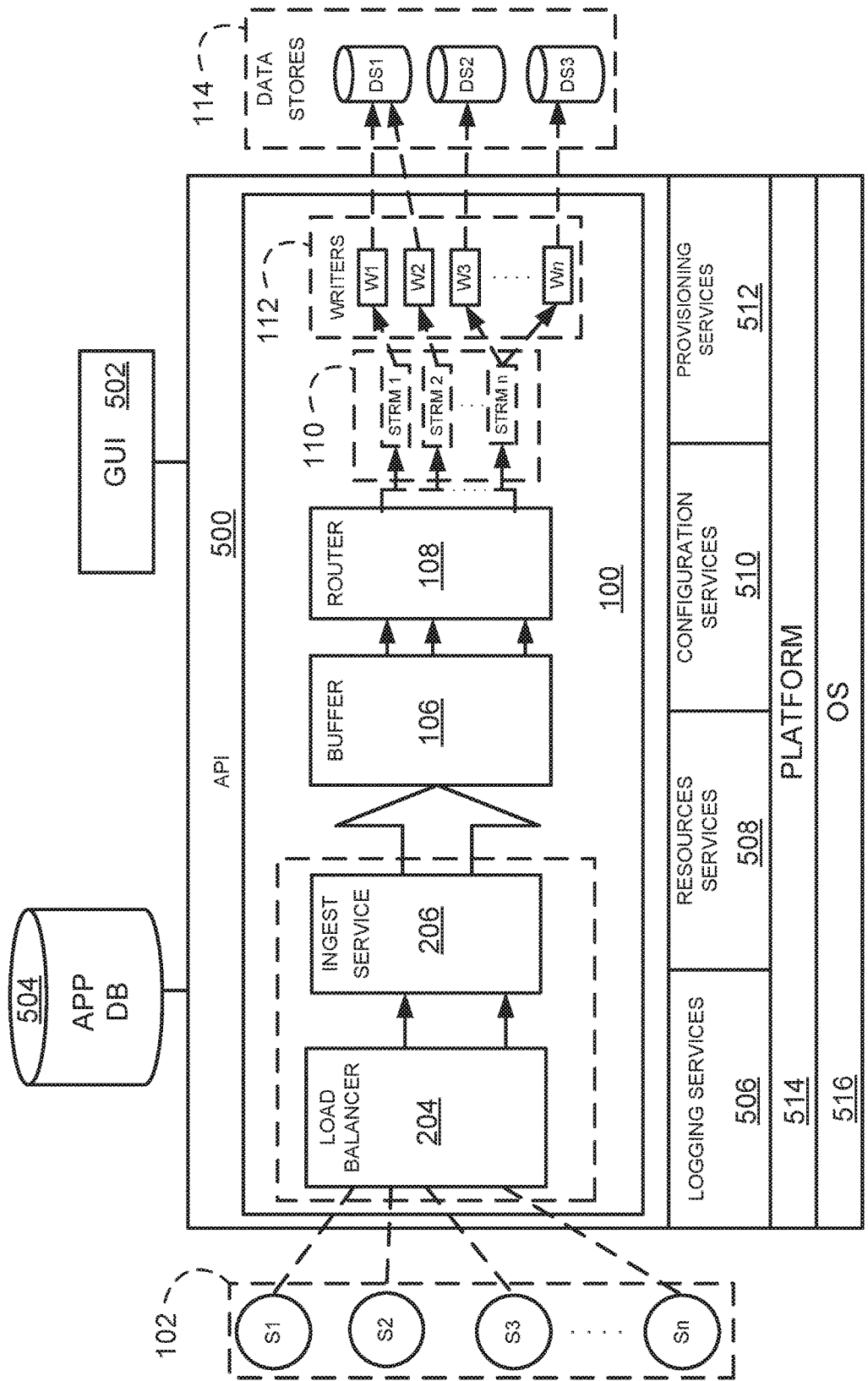
FIG. 5 is a block diagram of an example data stream management system.

FIG. 5 is an example of the data stream management system 100 in a software environment. In one example, the data stream management system 100 may be accessed through an API 500. The API 500 may provide an interface to the data sources 102 and a user graphical user interface ("GUI") 502. The GUI 502 may allow a user to interact with the data stream management system 100 through various APIs, which may include setting system parameters, adding/removing data sources 102 and data stores 114, and various other system management tasks. An API database 504 may also interface with the data stream management system 100 via the API 500. The information in the API database 504 may provide configuration information for the data stream management system 100 such as data sources 102, users, and targets (e.g. data stores 114), as well as performance metrics of the data stream management system 100, which may be accessible via the GUI 502. The ingest service module 206 may access the API database 504 when authenticating a request 200.

The data stream management system 100 may also include various command and control services, which in one example may be executable APIs. Logging services 506 provide centralized logging capabilities for various logs generated within the data stream management system 100 to be viewed, such as activity by the various modules. The logging services 506 may aggregate the generated logs for ease of location and analysis. Resource services 508 may control scalable features of the data stream management system 100, such as the number of instances in the ingest service module 206 and the router module 108. Configuration services 510 provide the manner in which connectivity with the data stream management system 100 may occur. The provisioning service 512 provides the process in how various components of the data stream management system 100 are presented. The data stream management system 100 may exist on a platform 514 that may be hardware-based, cloud-based, or other suitable platform, which may execute on a suitable operating system 516 across one or more devices.

In other examples, the records 210 may be routed directly to the data streams 110. In such a scenario, each ingest instance 208 may identify the data source 102 via the request header in each received request 200, as well as authenticate each request 200 via an API key or other manner. Each record 210 created by an ingest instance 208 may be routed by the ingest instance 208 to the data stream 110 of the corresponding to the data source 102 of the record 210. Due to the horizontal elasticity of each data stream 110, records 210 may be continuously added to each data stream 110 while being consumed by the writer modules 112.

Figure 6:
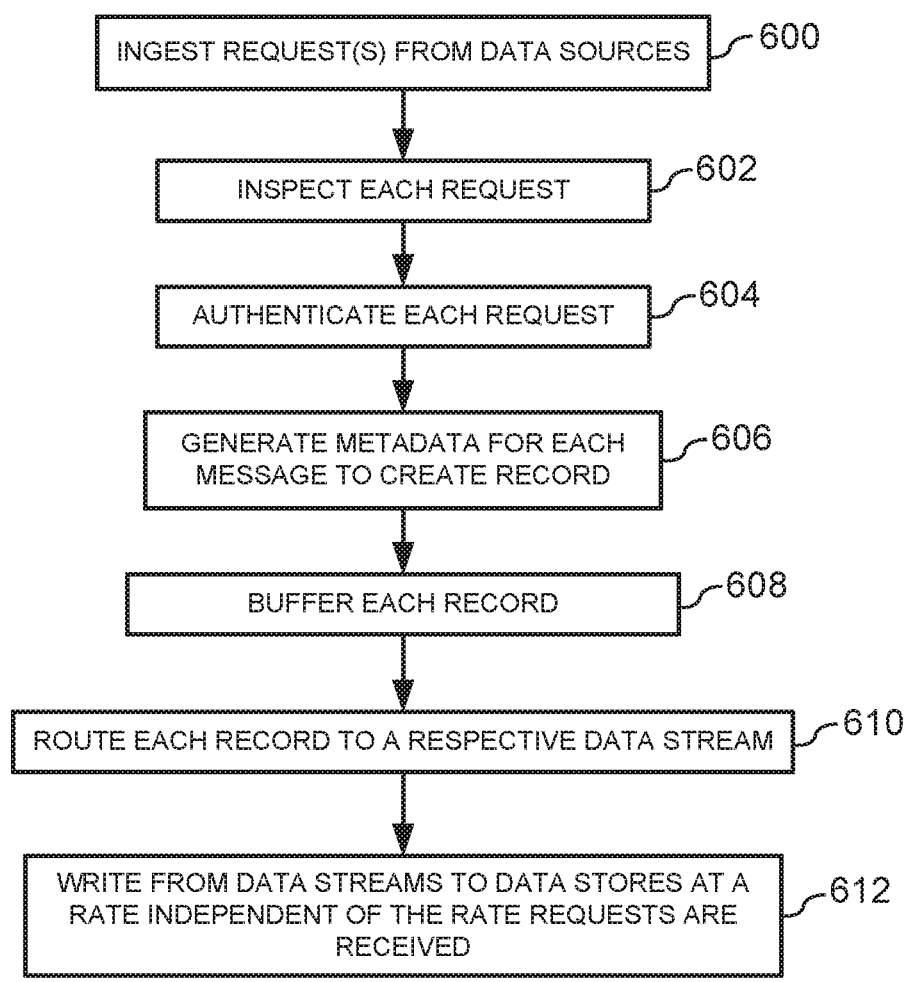
FIG. 6 is an operation flow diagram of example operation of a data stream management system.

FIG. 6 is an operational flow diagram of the data stream management system 100. In one example, one or more requests 200 are ingested by the data stream management system 100 from the data sources 102 (600). In one example, the requests 200 may be ingested singly or in batches according to user-based criteria and via an API by the load balancer 400. In one example, the load balancer 204 may receive the requests 200 and distribute them to ingest instances 208 of the ingest module 106. The data stream management system 100 may inspect each received request 200 to determine the data source 102 of the request 200 and the number of messages 202 (602), which, in one example, may be performed by one or more ingest instances 208. The data stream management system 100 may also authenticate each request 200 to ensure it is from an authorized data source 102 (604). In one example, this may be performed by an ingest instance 208 and involve checking the API key in the request 200 against valid API keys. The data stream management system 100 may also add metadata to each message 202 to create a record 210 (606). In one example, an ingest instance 208 may add the metadata to each message 202.

After creation of a record 210, the data management system 100 may buffer each record 210 (608), which in one example, may be done by the ingest instance 208 pushing a record 210 to the buffer module 106. Each record 210 may remain in the buffer module 106 until being routed to a data stream 110 (610). In one example, one or more router instances 400 from the router module 108 may pull records 210 from the buffer module 106. In one example, each data stream 110 may be dedicated to a respective data source 102. A router instance 400 pulling a record 210 from the buffer module 106 may identify the data source 102 based on the metadata and push the record 210 to the respective data stream 110. Once in the data stream 110, the records 210 or messages 202 may be written to the data stores 114 at rate independent from a rate at which records 210 are received from the data sources 102 (612). In one example, the writer modules 112 may consume records 210 from the data streams 110 to write to the respective data stores 114. Thus, as records 210 continue to be pushed to the buffer module 106, the writer modules 112 may continue to write the records 210 to the respective data store 114 at a rate acceptable to the respective data store 114. In one example, the writer modules 112 may determine if the entire records 210 are to be written to the respective data store 114 or just the messages 202.

Figure 7:
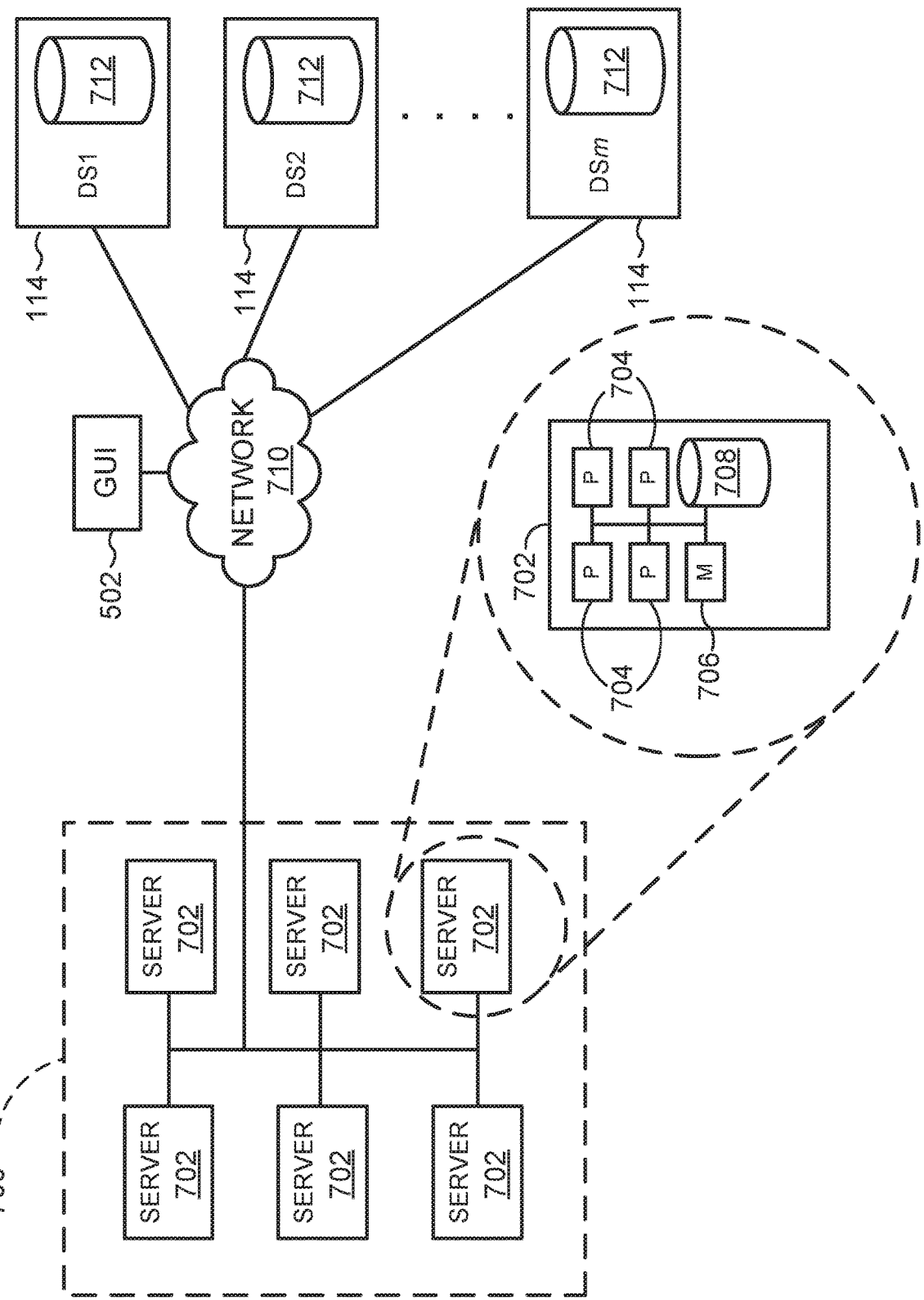
FIG. 7 is an example of a hardware environment for a data stream management system to operate.

FIG. 7 is a block diagram of a hardware environment on which the data stream management system 100 may be executed. In one example, a server cluster 700 may include servers 702, which may be interconnected to one another. Each server 702 may include one or more processors 704. Each processor 704 may be a physical processor, virtual processor, or some combination thereof. Various processing techniques may be implemented by the processors 704 such as multiprocessing, multitasking, parallel processing and the like, for example. Each server 702 may also include on or more memories 706. Memory 706 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Each server 702 may also include persistent storage 708, which may include hard drives, flash drives, hybrid drives, or any other devices capable of persistent storage.

During operation, the GUI 502 may access the data stream management system 100 executed on the server cluster 700 via a network 710. The network 710 may be wired, wireless, or some combination thereof. The network 710 may be a virtual private network, web-based, directly-connected, or some other suitable network configuration. The data stores 114 may also be accessed via the network 710. Requests 200 received from the data sources 102 may also be received via the network to the server cluster 700. In the example of FIG. 7, the server cluster is shown as including a plurality of server 700. In such a scenario, the buffer module 106 contents may be replicated across one or more servers 702 to avoid loss of records 210 being maintained during operation. Moreover, the servers cluster 700 is shown as including a plurality of servers 702, however, in other examples as single server 702 may be used with records 210 replicated across the processors of the server 702. In in the example of FIG. 7 the servers 702 of server cluster 700 are shown as being directly connected; however, in other examples, the servers 702 may be individually connected to the network 710.

The data stores 114 may also connect to the server cluster 700 via the network 710. In one example, each data store 114 may be an independent system accessible by the data stream management system 100 allowing data to be stored to the different data stores 114 in the manner describe herein. Each data store 114 may include its own persistent storage 712, as well as processing array and memories (not shown) and any other software/hardware required to operate in the desired manner.

The examples implementing a data store system may be applied to any suitable data store, such as file system or database, for example. Thus, the examples provided herein may be applied to any suitable data. While various examples of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system comprising:
at least one processor configured to:
receive data from a plurality of independent data sources, wherein the data from each respective data source is received at a rate determined by the respective data source;
buffer the received data in a buffer, wherein received data from different independent data sources is collectively buffered in the buffer, wherein the buffer is configured into a plurality of partitions, and wherein each partition is configured to concurrently buffer received data from different independent data sources together; and
write the buffered received data to at least one data store at a rate independent of the respective rates at which data from the plurality of independent data sources is received, wherein the at least one data store comprises an independent data store management system.

2. The system of claim 1, wherein the at least one data store comprises a plurality of data stores, and wherein at least one processor is further configured to:
generate a plurality of data streams, wherein each data stream corresponds to a respective one of the independent data sources;
route the buffered received data to the data steam corresponding to the independent data source from which the received data originated; and
write the received data from each data stream to one or more of the plurality of data stores.

3. The system of claim 2, wherein the at least one processor is further configured to route the buffered received data to the data steam corresponding to the independent data source from which the received data originated.

4. The system of claim 2, wherein the at least one processor is further configured to write the buffered received data from each data stream to one or more of the plurality of data stores at respectively different rates.

5. The system of claim 4, wherein the at least one processor is further configured to:
receive feedback from one or more of the plurality of data stores; and
adjust the rate at which the buffered received data is written to the one or more data stores based on the feedback.

6. The system of claim 1, wherein the received data comprises a plurality of requests, wherein the processor is further configured to:
authenticate each request;
identify each message in the request;
provide metadata to each message; and
buffer each message with the respective metadata.

7. A method comprising:
receiving data from a plurality of independent data sources, wherein the data from each respective data source is received at a rate determined by the respective data source;
buffering the received data in a buffer, wherein received data from different independent data sources is collectively buffered in the buffer, wherein the buffer is configured into a plurality of partitions, and wherein each partition is configured to concurrently buffer received data from different independent data sources together; and writing the buffered received data to at least one data store at a rate independent of the respective rates at which data from the plurality of independent data sources is received, wherein the at least one data store comprises an independent data store management system.

8. The method of claim 7, wherein the at least one data store comprises a plurality of data stores, and wherein the method further comprises:
generating a plurality of data streams, wherein each data stream corresponds to a respective one of the independent data sources;
routing the buffered received data to the data steam corresponding to the independent data source from which the received data originated; and
writing the received data from each data stream to one or more of the plurality of data stores.

9. The method of claim 8 further comprising routing the buffered received data to the data steam corresponding to the independent data source from which the received data originated.

10. The method of claim 8, wherein writing the received data from each data stream to one or more of the plurality of data stores comprises writing the buffered received data from each data stream to one or more of the plurality of data stores at respectively different rates.

11. The method of claim 10 further comprising:
receiving feedback from one or more of the plurality of data stores; and
adjusting the rate at which the buffered received data is written to the one or more data stores based on the feedback.

12. The method of claim 7, wherein the received data comprises a plurality of requests, wherein the method further comprises:
authenticating each request;
identifying each message in the request;
providing metadata to each message; and
buffering each message with the respective metadata.

13. A non-transitory computer-readable medium encoded with a plurality of instructions executable by a processor, the plurality of instructions comprising:
instructions to receive data from a plurality of independent data sources, wherein the data from each respective data source is received at a rate determined by the respective data source;
instructions to buffer the received data in a buffer, wherein received data from different independent data sources is collectively buffered in the buffer, wherein the buffer is configured into a plurality of partitions, and wherein each partition is configured to concurrently buffer received data from different independent data sources together;
instructions to generate a plurality of data streams, wherein each data stream corresponds to a respective one of the independent data sources; and
instructions to write the buffered received data to at least one data store at a rate independent of the respective rates at which data from the plurality of independent data sources is received, wherein the at least one data store comprises an independent data store management system.

14. The non-transitory computer-readable medium of claim 13, wherein the at least one data store comprises a plurality of data stores, and wherein the plurality of instructions further comprises:
instructions to generate a plurality of data streams, wherein each data stream corresponds to a respective one of the independent data sources;
instructions to route the buffered received data to the data steam corresponding to the independent data source from which the received data originated; and
instructions to write the received data from each data stream to one or more of the plurality of data stores.

15. The non-transitory computer-readable medium of claim 14, wherein the plurality of instructions further comprises-instructions to route the buffered received data to the data steam corresponding to the independent data source from which the received data originated.

16. The non-transitory computer-readable medium of claim 15, wherein the instructions to write the buffered received data from each data stream to one or more of the plurality of data stores comprises instructions to write the received data from each data stream to one or more of the plurality of data stores at respectively different rates.

17. The computer-readable medium of claim 13, wherein the plurality of instructions further comprises:
instructions to receive feedback from one or more of the plurality of data stores; and
instructions to adjust the rate at which the buffered received data is written to the one or more data stores based on the feedback.

* * * * *